(12) United States Patent
Radakovitz et al.

(10) Patent No.: US 11,270,066 B2
(45) Date of Patent: Mar. 8, 2022

(54) TEMPORARY FORMATTING AND CHARTING OF SELECTED DATA

(75) Inventors: Samuel Chow Radakovitz, Puyallup, WA (US); Brian Scott Ruble, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 710 days.

(21) Appl. No.: 12/770,992

(22) Filed: Apr. 30, 2010

(65) Prior Publication Data
US 2011/0271172 A1 Nov. 3, 2011

(51) Int. Cl.
*G06F 40/18* (2020.01)
*G06F 3/0481* (2022.01)
*G06F 3/0482* (2013.01)

(52) U.S. Cl.
CPC ............ *G06F 40/18* (2020.01); *G06F 3/0481* (2013.01); *G06F 3/0482* (2013.01)

(58) Field of Classification Search
CPC ....... G06T 11/206; G06T 11/60; G06F 17/246
USPC ............................... 715/215, 212; 345/440.1
See application file for complete search history.

(56) References Cited

U.S. PATENT DOCUMENTS

| 5,461,708 | A | * | 10/1995 | Kahn ...................... G06F 40/18 |
| | | | | 345/440 |
| 5,548,703 | A | | 8/1996 | Berry et al. |
| 5,706,448 | A | | 1/1998 | Blades |
| 5,745,717 | A | | 4/1998 | Vayda |
| 5,940,076 | A | | 8/1999 | Sommers |
| 5,999,193 | A | | 12/1999 | Conley, Jr. et al. |
| 6,028,600 | A | | 2/2000 | Rosin et al. |
| 6,223,189 | B1 | * | 4/2001 | Steffens ................ G06F 40/151 |
| | | | | 715/209 |
| 6,337,698 | B1 | | 1/2002 | Keely, Jr. et al. |

(Continued)

FOREIGN PATENT DOCUMENTS

| CN | 1335951 A | 2/2002 |
| CN | 1794220 A | 6/2006 |

(Continued)

OTHER PUBLICATIONS

Josh Wilson, "Excel 2003: Charting, Learning Guide", Tufts University ITS, May 4, 2006 http://ase.tufts.edu/its/trainDocuments/excel03Charting.pdf.*

(Continued)

*Primary Examiner* — Cesar B Paula
*Assistant Examiner* — David Faber
(74) *Attorney, Agent, or Firm* — NovoTechIP International PLLC

(57) ABSTRACT

Selected data is temporarily formatted and charted to assist a user in visualizing the selected data without the user having to manually create the display of the charted data. Once the temporary formatting and charting is automatically applied to the selected data, a user may interact with the visual formatting and charts to gain additional information. For example, the chart may be formatted differently, reference lines may be added, the chart may be sorted, the type of chart(s) displayed may be changed, the user may graphically navigate over the chart to obtain more detailed information, and the like. Once the user has completed interacting with the temporarily formatted and created chart(s) the visualizations are removed from the display.

11 Claims, 7 Drawing Sheets

(56) References Cited

U.S. PATENT DOCUMENTS

| | | |
|---|---|---|
| 6,448,987 B1 | 9/2002 | Easty |
| 6,480,194 B1 | 11/2002 | Sang'udi |
| 6,515,682 B1 | 2/2003 | Washington |
| 6,920,608 B1* | 7/2005 | Davis .................. G06F 40/143 715/209 |
| 7,002,580 B1 | 2/2006 | Aggala et al. |
| 7,036,090 B1 | 4/2006 | Nguyen |
| 7,210,107 B2 | 4/2007 | Wecker |
| 7,516,419 B2 | 4/2009 | Petro |
| 7,548,925 B2 | 6/2009 | Bradlee et al. |
| 8,352,881 B2 | 1/2013 | Champion |
| 8,402,391 B1 | 3/2013 | Doray |
| 8,605,090 B2 | 12/2013 | Garg et al. |
| 2002/0122072 A1 | 9/2002 | Selker |
| 2002/0194095 A1* | 12/2002 | Koren ................. G06F 16/9574 705/35 |
| 2003/0154443 A1 | 8/2003 | Papierniak .................. 715/211 |
| 2003/0169295 A1 | 9/2003 | Becerra |
| 2004/0143485 A1* | 7/2004 | Naples ............. G06Q 10/06375 705/7.37 |
| 2004/0212617 A1 | 10/2004 | Fitzmaurice |
| 2005/0198042 A1 | 9/2005 | Davis |
| 2006/0059414 A1 | 3/2006 | Cory et al. |
| 2007/0063995 A1 | 3/2007 | Bailey |
| 2007/0083547 A1 | 4/2007 | Schnauffer |
| 2007/0101255 A1 | 5/2007 | Garg et al. |
| 2007/0260970 A1 | 11/2007 | Dorwart |
| 2008/0082908 A1* | 4/2008 | MacGregor ............ G06Q 10/10 715/215 |
| 2008/0115049 A1 | 5/2008 | Tolle ............................ 715/209 |
| 2008/0222569 A1 | 9/2008 | Champion |
| 2008/0229245 A1 | 9/2008 | Ulerich |
| 2008/0250349 A1 | 10/2008 | Peiro et al. |
| 2009/0007015 A1 | 1/2009 | Mandic |
| 2009/0037813 A1 | 2/2009 | Newman |
| 2009/0079731 A1 | 3/2009 | Fitzmaurice |
| 2009/0313537 A1 | 12/2009 | Tsui-Ying |
| 2009/0327963 A1 | 12/2009 | Mouilleseaux |
| 2010/0057693 A1* | 3/2010 | Himstedt ............ G06F 11/3672 707/E17.005 |
| 2010/0182264 A1 | 7/2010 | Hahn |
| 2010/0185985 A1 | 7/2010 | Chmielewski |
| 2010/0214243 A1 | 8/2010 | Birnbaum |
| 2011/0055771 A1* | 3/2011 | Chen .................... G06F 16/954 715/854 |
| 2011/0095993 A1 | 4/2011 | Zuverink |
| 2016/0357425 A1 | 12/2016 | Radakovitz et al. |

FOREIGN PATENT DOCUMENTS

| | | |
|---|---|---|
| CN | 101253494 A | 8/2008 |
| CN | 101300571 A | 11/2008 |
| CN | 101689179 A | 3/2010 |
| JP | H0-33089 A | 1/1991 |
| JP | H03-225572 A | 10/1991 |
| JP | 08227348 | 9/1996 |
| JP | H09-153101 A | 6/1997 |
| JP | 2001-188805 A | 7/2001 |
| JP | 2001-357344 A | 12/2001 |
| JP | 2003-016226 A | 1/2003 |
| JP | 3515485 | 1/2004 |
| JP | 2005-258548 A | 9/2005 |
| JP | 2005-269243 A | 9/2005 |
| JP | 2007-140625 A | 6/2007 |
| JP | 2008-535125 A | 8/2008 |
| JP | 5397574 B1 | 1/2014 |
| KR | 1020090018927 A | 2/2009 |
| KR | 1020100016487 A | 2/2010 |
| RU | 2005140146 A | 7/2007 |
| TW | 2006036551 A | 10/2006 |
| TW | 200704121 A | 1/2007 |
| TW | 200905490 A | 2/2009 |
| TW | 200928950 A | 7/2009 |
| WO | 2006/108159 A2 | 10/2006 |
| WO | 2014141323 A1 | 9/2014 |

OTHER PUBLICATIONS

"Change chart colors based on value?", mrexcel.com forums, May 21, 2007, http://www.mrexcel.com/forum/excel-questions/262749-change-chart-colors-based-value.html.*

Sorting in an Excel Chart won't work properly, pcreview.com, Jan. 8, 2007 http://www.pcreview.co.uk/forums/sorting-excel-chart-wont-work-properly-t2810060.html.*

Officelabs, Chart Advisor, [video] retrieved from http://www.youtube.com/watch?v=kNGOQMzBu3I on Sep. 9, 2013, screenshots and transcript created Sep. 9, 2013, video published Aug. 28, 2008.*

Elaine Marmel, Absolute Beginner's Guide to Quattro Pro® X3, Feb. 8, 2006, Que, Chapter 11, "Creating a Chart".*

Corel, "Quattro Pro X4", copyrighted 1996-2009, Corel Corp., 2 Screenshots (SS1-2)(2 pages total).*

Amazon, "Wordperfect Office X4 Standard", online since at least Apr. 16, 2008, Amazon.com, 4 pages. (Used to diclose Corel WordPerfect Office X4/Quattro Pro X4 was available to the public since Apr. 16, 2008).*

Harvey, Greg "Microsoft Office Excel 2007 for Dummies", 405 pages (Year: 2007).*

Harvey, Greg , "Hiding Graphic Objects in Excel 2007". 2 pages http://www.dummies.com/software/microsoft-office/excel/hiding-graphic-objects-in-excel-2007/ (Year: 2007).*

International Search Report dated Feb. 17, 2012, issued in PCT/US2011/033804.

Office Action dated Apr. 11, 2012, issued in U.S. Appl. No. 12/771,422.

Microsoft; "Microsoft Office Online—Microsoft Office Excel—Change the format of chart elements"; accessed on Feb. 25, 2010, at http://office.microsoft.com/en-us/excel/HA101534471033,aspx; 5 pgs.

"Chart View"; accessed on Feb. 25, 2010 at http://help.creator.zoho.com/chart-view.html; 4 pgs.

SAS Institute, Inc.; "Defining a Data Source"; accessed Feb. 25, 2010, at http://support.sas.com/documentation/cdl/en/bidbrdug/61856.html; 11 pgs.

The MathWorks; Displaying Query Results :: Using Visual Query Builder (Database Toolbox™); accessed Feb. 25, 2010, at http://www.mathworks.com/access/helpdesk/help/toolbox/database/ug/f7-27823.html; 10 pgs.

Davis, Y.; "Google Docs: Creating Charts in Spreadsheets"; Bright Hub!; Jun. 18, 2009; http://www.brighthub.com/internet/google/articles/5747.aspx; 2 pgs.

Cahill, C.; "Silverlight Chart Data-Point Markers and Mouse Events"; Nov. 19, 2009; http://www.componentart.com/community/blogs/corey/archive/2009/11/19/silverlight-chart-data-point-markers-on-mouse-hover.aspx; 5 pgs.

Mitchell, S.; "Using Microsoft's Chart Controls in an ASP.NET Application: Serializing Chart Data"; http://www.4guysfromrolla.com/articles/021010-1.aspx; 7 pgs.

International Search Report dated Sep. 28, 2011, in PCT/US2011/032383.

Office Action dated Oct. 3, 2012, issued in U.S. Appl. No. 12/771,422.

Office Action dated Apr. 25, 2013, in Chinese Patent Appl. No. 201180021494.6, w/translation.

Amendment filed Jul. 19, 2012, in U.S. Appl. No. 12/771,422.

Amendment filed Apr. 3, 2013, in U.S. Appl. No. 12/771,422.

Office Action dated Jul. 9, 2013, in New Zealand Patent Appl. No. 603049.

Office Action dated Oct. 17, 2013, in Chinese Patent Appl. No. 201180021494.6, w/translation.

Office Action dated Sep. 30, 2013, in New Zealand Patent Appl. No. 603049.

Office Action dated Aug. 29, 2013, in Columbia Patent Appl. No. 12-215867, w/summary.

Office Action dated Jun. 6, 2013, issued in U.S. Appl. No. 12/771,422.

(56) References Cited

OTHER PUBLICATIONS

Office Action dated Dec. 16, 2013, issued in U.S. Appl. No. 12/771,422.
Amendment filed Nov. 19, 2013, in U.S. Appl. No. 12/771,422.
"First Office Action and Search Report Issued in Chinese Patent Application No. 201180021493.1", dated Oct. 27, 2014, 14 Pages.
Office Action dated Nov. 14, 2014, issued in U.S. Appl. No. 12/771,422.
"Office Action issued in Japanese Patent Application No. 2013-507996", dated Feb. 24, 2015, 12 Pages.
"Office Action issued In Japan Patent Application No. 2013-508129", dated Mar. 3, 2015, 4 Pages.
"Third Office Action and Search Report Issued in Chinese Patent Application No. 201180021494.6", dated Mar. 17, 2015, 12 Pages.
"Office Action issued in Chile Patent Application No. 201203002", dated Mar. 20, 2015, 5 Pages. (w/o English Translation).
"Office Action Received for Russian Patent Application No. 2012146096", dated Apr. 2, 2015, 6 Pages. (w/o English Translation).
"Final Office Action Received in China Patent Application No. 201180021494.6", dated Mar. 6, 2014. Filed Date: Apr. 25, 2011, 6 Pages.
"First Office Action Received in Australia Patent Application No. 2011245430", dated Feb. 14, 2014, Filed Date: Apr. 25, 2011, 2 Pages.
"Office Action Issued in Australia Patent Application No. 2011245657", dated Feb. 26, 2014, 3 Pages.
"Office Action Issued in Australia Patent Application No. 2011245657", dated Apr. 16, 2014, 3 Pages.
"Office Action Issued in Australia Patent Application No. 2011245657", dated Aug. 26, 2014, 5 Pages.
"Office Action Issued in Colombia Patent Application No. 12-215867", dated Apr. 28, 2014, 6 Pages.
Oppenheimer, Diego, "Chart Advisor", Published on: Sep. 25, 2008, Avaialble at: http://blogs.office.com/2008/09/25/chart-advisor/.
Amendment filed Jun. 16, 2014, in U.S. Appl. No. 12/771,422.
"Office Action Issued in Taiwan Patent Application No. 100110806", dated Sep. 1, 2015, 10 Pages.
Amendment filed Mar. 10, 2015, in U.S. Appl. No. 12/771,422.
"Office Action Received for Taiwan Patent Application No. 100109576", dated Jun. 3, 2015, 11 Pages.
"Second Office Action Received for China Patent Application No. 201180021493 1", dated Jun. 11, 2015, 11 Pages.
Japanese Notice of Allowance for Application No. 2013-508129—dated Jul. 7, 2015.
Chinese Fourth Office Action for Application No. 201180021494.6 dated Aug. 4, 2015.
Office Action dated Jul. 2, 2015, issued in U.S. Appl. No. 12/771,422.
Australia Notice of Allowance Issued in Australia Patent Application No. 2011245657, dated Oct. 24, 2014, 2 Pages.
Australia Notice of allowance Received in Patent Application No. 2011245430, dated May 2, 2014, 2 Pages.
Chinese Fifth Office Action Issued in Patent Application No. 201180021494.6, dated Dec. 25, 2015, 7 Pages.
Chinese Notice of Allownace in Chinese Patent Application No. 201180021493.1, dated Apr. 7, 2016 with English translation. 4 Pages.
Chinese Office Action Issued in Patent Application No. 201180021494. 6, dated May 17, 2016, with English translation 8 Pages.
Chinese Third Office Action Issued in Chinese Patent Application No. 201180021493.1, dated Dec. 21, 2015, 12 Pages.
Israel Office Action Issued in Patent Application No. 222259, dated May 22, 2016, with English translation. 3 Pages.
Japanese Office Action Issued in Japanese Patent Application No. 2013-507996, dated Jan. 20, 2016, 6 Pages.
New Zealand Notice of Allowance dated Jan. 22, 2015, in New Zealand Patent Appl. No. 603049.1 page.
South Africa Notice of Allowance Issued in Patent Application No. 2012/07368 dated Oct. 9, 2013, 1 Page.
South Africa Notice of Allowance Issued in Patent Application No. 2012/07369 dated Oct. 9, 2013, 1 Page.
Taiwan Notice of Allowance Issued in Patent Application No. 100109576, dated Sep. 25, 2015, 4 Pages.
Taiwan Notice of Allowance Issued in Patent Application No. 100110806, dated Dec. 23, 2015, 4 Pages.
U.S. Appl. No. 12/771,422 Notice of Allowance dated Jan. 8, 2016. 22 pages.
"Notice of Allowance Issued in Russian Patent Application No. 2012146096", dated Sep. 7, 2016, 16 Pages.
"Further Examination Report issued in New Zealand Patent Application No. 603049", dated Sep. 30, 2013, 2 Pages.
Canada Office Action Issued in Patent Application No. 2795183 dated Dec. 29, 2016, 4 Pages.
Canada Office Action Issued in Patent Application No. 2795367 dated Feb. 9, 2017, 6 Pages.
Korean Office Action Issued in Patent Application No. 10-2012-7028253, dated Dec. 21, 2016, 8 Pages.
Chinese Office Action Issued in Patent Application No. 201180021494. 6, dated Feb. 20, 2017, with English translation 7 Pages.
Korean Office Action Issued in Patent Application No. 10-2012-7028267, dated Mar. 17, 2017. with English Translation. 14 pages.
Russian Notice of Allowance Issued in Russian Patent Application No. 2012146096, dated Sep. 5, 2016, 16 Pages.
"Final Office Action Issued in U.S. Appl. No. 15/180,934", dated Sep. 20, 2018, 21 Pages.
"Non Final Office Action Issued in U.S. Appl. No. 15/180,934", dated Jan. 7, 2019, 18 Pages.
Cameron, A. Colin., "Excel 2007 Charts: Column Bar, Pie and Line", Available at: http://cameron.econ.ucdavis.edu/excel/ex12charts. html, Jan. 2009, 10 Pages.
Notice of Allowance Issued in related Korean Patent Application No. 10-2012-7028253, dated Jul. 31, 2017, 4 Pages, with English Translation.
Notice of Allowance issued in related Japanese Patent Application No. 2013-507996, dated Aug. 31, 2016, 4 Pages, with English Translation.
Office Action Issued in related Korean Patent Application No. 10-2012-7028253, dated Dec. 21, 2016, 8 Pages, with English Translation.
Office Action Issued in related Korean Patent Application No. 10-2012-7028267, dated Mar. 17, 2017, 14 pages, with English Translation.
Abe, Kaori, "Hitome De Wakaru Excel 2013", 1st Edition, Nikkei Business Publications, Inc., Feb. 12, 2013, pp. 138 and 139 (with English Translation).
Notice of Allowance dated May 7, 2015, in related Mexican Patent Appl. No. MX/a/2012/012420 with English Translation, 2 pages.
Office Action Issued in related Russian Patent Application No. 2012146096, dated Dec. 16, 2015, 8 Pages, with English Translation.
Office Action Issued in related Israel Patent Application No. 222259, dated Aug. 30, 2015, 4 Pages, with English Translation.
Office Action Issued in related Canadian Patent Application No. 2,795,367, dated Jan. 10, 2018, 5 Pages.
U.S. Appl. No. 15/180,934 Office Action dated Feb. 26, 2018, 19 pages.
Office Action Issued in related Argentina Patent Application No. P110101497, dated Mar. 26, 2018, 9 Pages, with English Translation.
Notice of Allowance Issued in related Malaysian Patent Application No. PI2012004395,dated May 15, 2018, 2 Pages, with English Translation.
Office Action Issued in related Canadian Patent Application No. 2795183, dated May 23, 2018, 4 Pages.
U.S. Appl. No. 15/180,934 Amendment filed Jun. 1, 2018, 18 pages.
"Office Action Issued in Canadian Patent Application No. 2,795,367", dated Oct. 22, 2018, 4 Pages.
Extended European Search Report in Patent Application No. 11775430. 9, dated Dec. 11, 2017, 7 Pages.
Extended European Search Report in Patent Application No. 11775487. 9, dated Dec. 11, 2017, 7 Pages.

(56) References Cited

OTHER PUBLICATIONS

"Office Action Issued in Indian Patent Application No. 8602/CHENP/2012", dated Apr. 30, 2019, 7 Pages.
"Office Action Issued in European Patent Application No. 11775430.9", dated Mar. 5, 2019, 05 Pages.
"Office Action Issued in Canada Patent Application No. 2,795,367", dated May 15, 2019, 4 Pages.
"Final Office Action Issued in U.S. Appl. No. 15/180,934", dated Jul. 19, 2019, 21 Pages.
"Office Action Issued in Thailand Patent Application No. 1201005632", dated Sep. 3, 2019, 3 Pages.
"Office Action Issued in Indian Patent Application No. 8738/CHENP/2012", dated Jun. 26, 2019, 6 Pages.
"Add a Horizontal Line to a Column or Line Chart: Error Bar Method", Retrieved From: https://web.archive.org/web/20100202074134/http://peltiertech.com/Excel/Charts/AddLineHorzErrBar.html, Retrieved on: Feb. 2, 2020, 6 Pages.
"Office Action Issued in European Patent Application No. 11775430.9", dated Jan. 16, 2020, 5 Pages.
"Office Action Issued in Thailand Patent Application No. 1201005632", dated Jun. 4, 2020, 3 Pages.
"Office Action Issued in Canadian Patent Application No. 2795183", dated Jul. 14, 2017, 3 Pages.
"Office Action Issued in Malaysian Patent Application No. PI2012004395", dated Jul. 14, 2017, 4 Pages.

* cited by examiner

TEMPORARY FORMATTING AND CHARTING OF SELECTED DATA

BACKGROUND

Many individuals spend a lot of time trying to visualize data. Data is often presented in rows and columns of a spreadsheet as blocks of information without any visual graphical representation of the data. In order to understand the data, users spend time trying to figure out the best way to view the data and then create the charts that is needed to understand it. This process takes time and expertise in knowing how to use the visualization features of an application.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Selected data is temporarily formatted and charted to assist a user in visualizing the selected data without the user having to manually create the display of the charted data. Once the temporary formatting and charting is automatically applied to the selected data, a user may interact with the visual formatting and charts to gain additional information. For example, the chart may be formatted differently, reference lines may be added, the chart may be sorted, the type of chart(s) displayed may be changed, the user may graphically navigate over the chart to obtain more detailed information, and the like. Once the user has completed interacting with the temporarily formatted and created chart(s) the visualizations are removed from the display.

DETAILED DESCRIPTION

Figure 1:
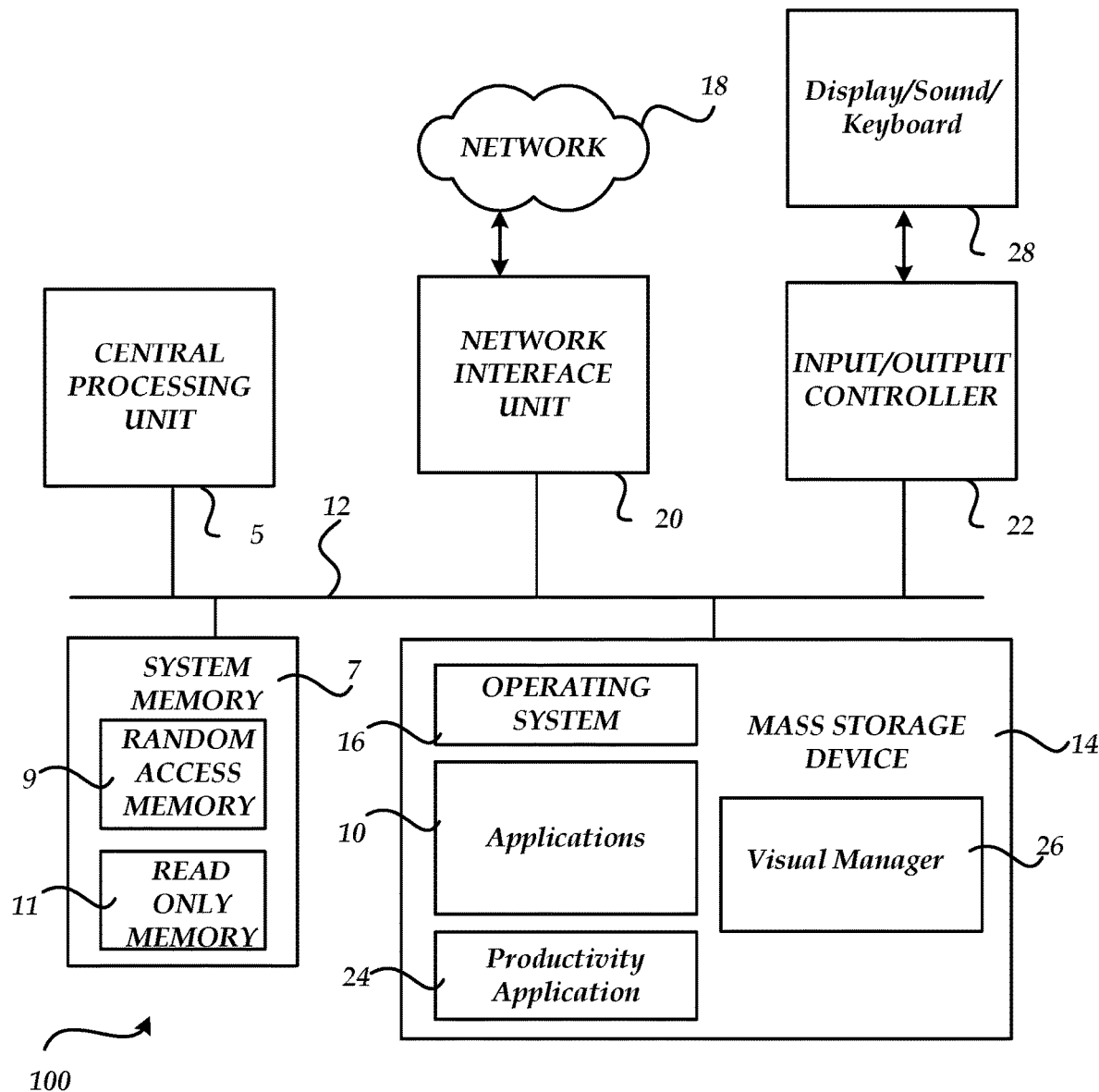
FIG. 1 illustrates a computer architecture for a computer.

Referring now to the drawings, in which like numerals represent like elements, various embodiments will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a desktop, a server, or mobile computer and includes a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 100 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage mediums and communication media. Computer storage mediums includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 operates in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide output to a display screen that includes a user interface 28, a printer, or other type of output device. User interface (UI) 28 is designed to provide a user with a visual way to interact with productivity application 24 that incorporates a temporary display of automatically formatted charts(s), as well as to interact with other functionality that is included on computing device 100.

As mentioned briefly above, a number of program modules and data files may be stored in the mass storage device 14 and RAM 9 of the computer 100, including an operating system 16 suitable for controlling the operation of a networked computer, such as the WINDOWS 7® operating system from MICROSOFT CORPORATION of Redmond, Wash. The mass storage device 14 and RAM 9 may also store one or more program modules. In particular, the mass storage device 14 and the RAM 9 may store one or more application programs. One of the application programs is a productivity application 24, such as one of the MICROSOFT EXCEL® or one of the other MICROSOFT OFFICE® programs. Generally, productivity application 24 is an application that a user utilizes when viewing and interacting with a block of data, such as within a spreadsheet and/or a table. Productivity application 24 is an application such as a spreadsheet program, a database program, a word-processing program, a presentation program and the like.

Visual manager 26 is configured to automatically temporarily format and chart selected data to assist a user in viewing and understanding the selected data. Since the charting is automatically performed on the charted data, the user does not have to manually create the display of the charted data. Once the temporary formatting and charting is automatically applied to the selected data, the user may interact with the visual formatting and charts to gain additional information. For example, the chart may be formatted differently, reference lines may be added, the chart may be sorted, the type of chart(s) displayed may be changed, the user may navigate over the chart to obtain more detailed information, and the like. Once the user has completed interacting with the temporarily formatted and created chart(s) they are removed from the display 28.

Figure 2:
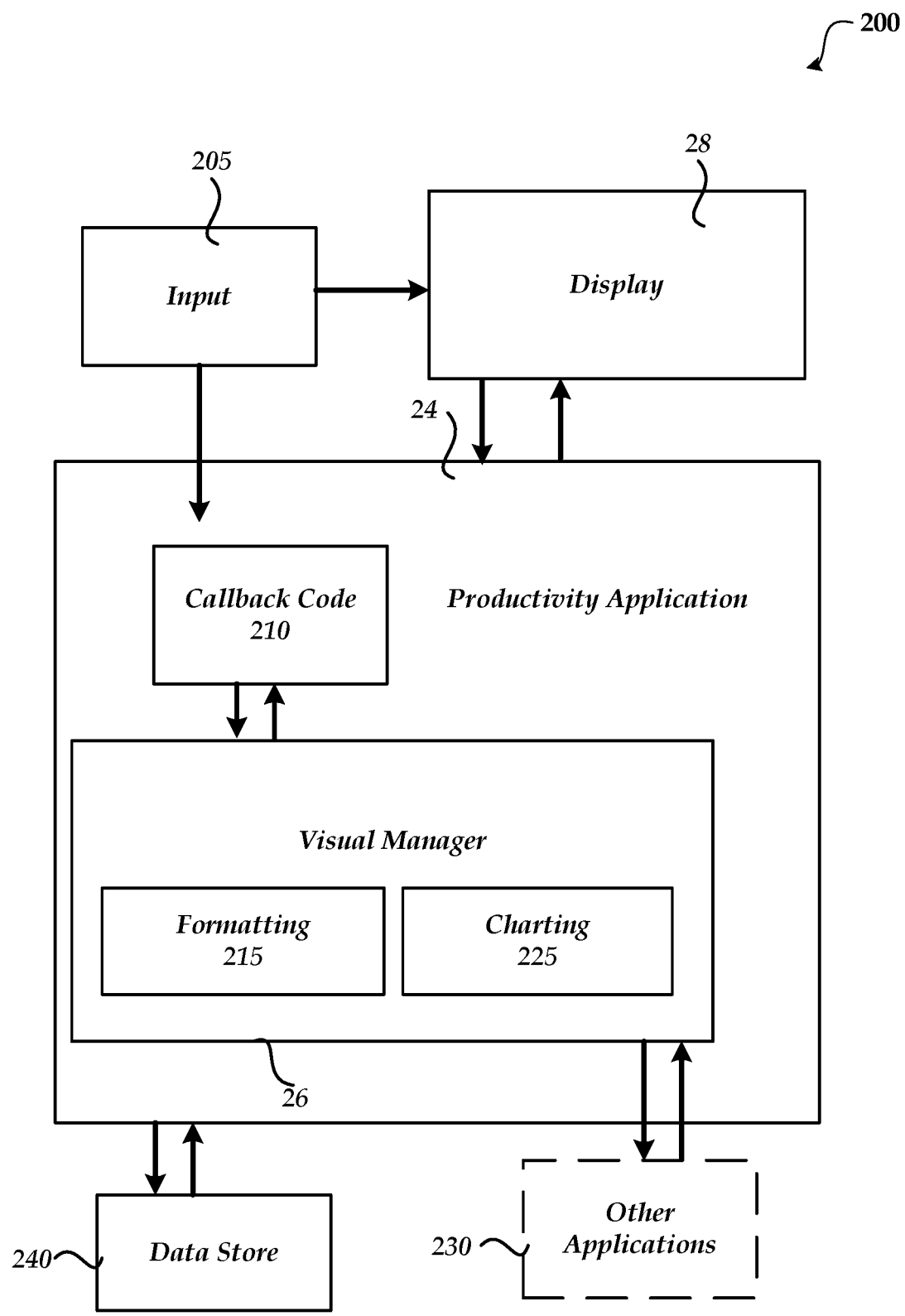
FIG. 2 shows an example temporary formatting and charting system.

FIG. 2 shows an example temporary formatting and charting system. As illustrated, system 200 includes display 28, visual manager 26, input 205, productivity application 24, data store 240, and other applications 230. Visual manager 26 may be implemented within presentation application 24 as shown in FIG. 2 or may be implemented externally from application 24 as shown in FIG. 1.

In order to facilitate communication with the visual manager 26, one or more callback routines, illustrated in FIG. 2 as callback code 210, may be implemented. Through the use of the callback code 210, the visual manager 26 may query for additional information used in temporarily formatting and charting data selected from within productivity application 24. For example, visual manager 26 may request to be informed when a user selects data, selects a user interface element that is associated with one of the temporarily displayed charts and/or move and navigates over a displayed chart. Other information may also be provided that relate to the features of the application. As discussed above, visual manager 26 is configured to automatically format and create charts from data that is selected within productivity application 24 such that the selected data may be understood in a graphical manner.

Figure 3:
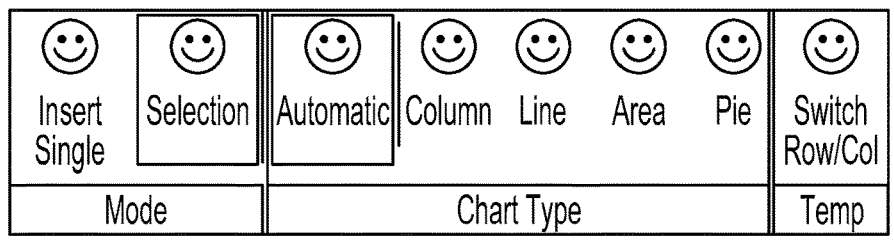
FIGS. 3-5 show exemplary user interfaces and displays for temporarily formatting and charting selected data.
Figure 3:
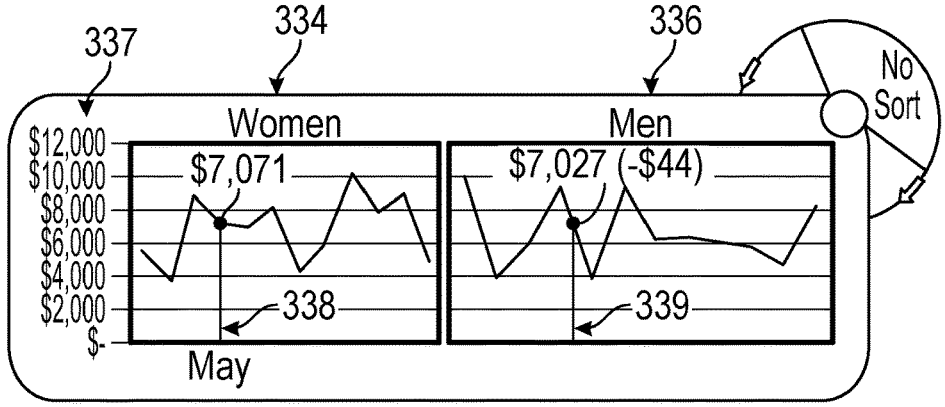
Figure 4:
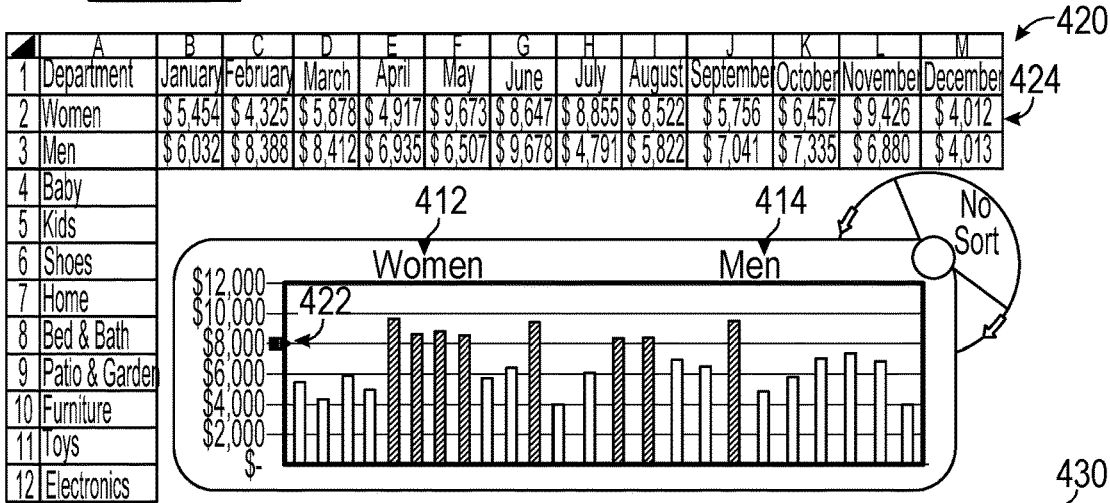
Figure 4:
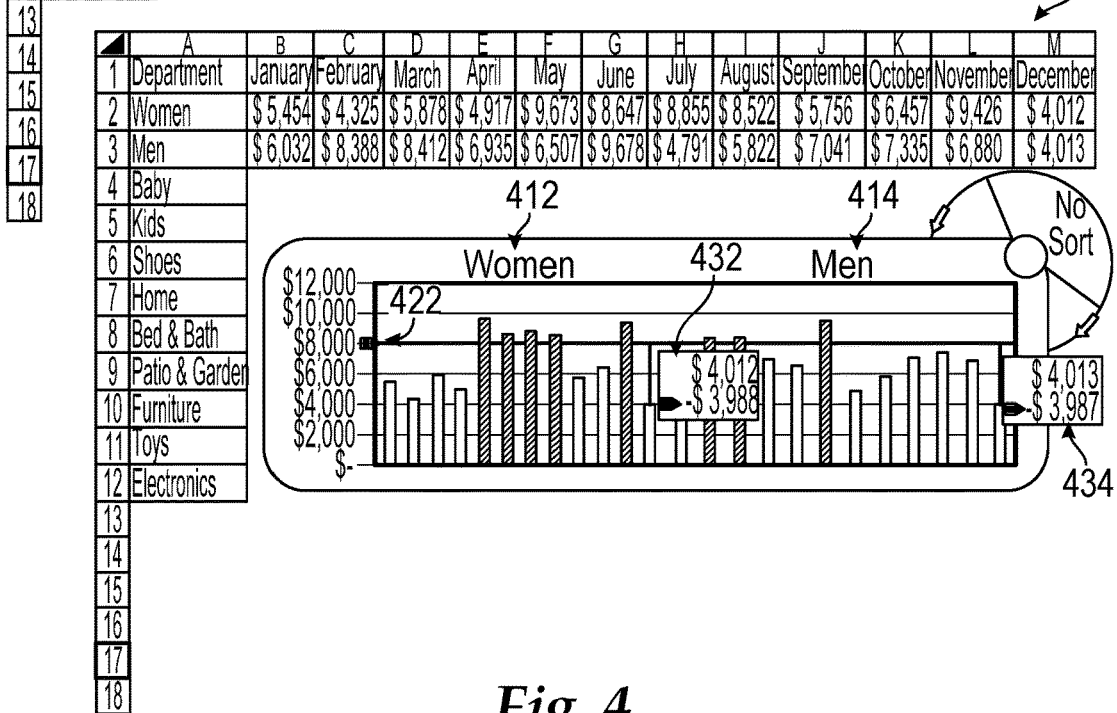
Figure 5:
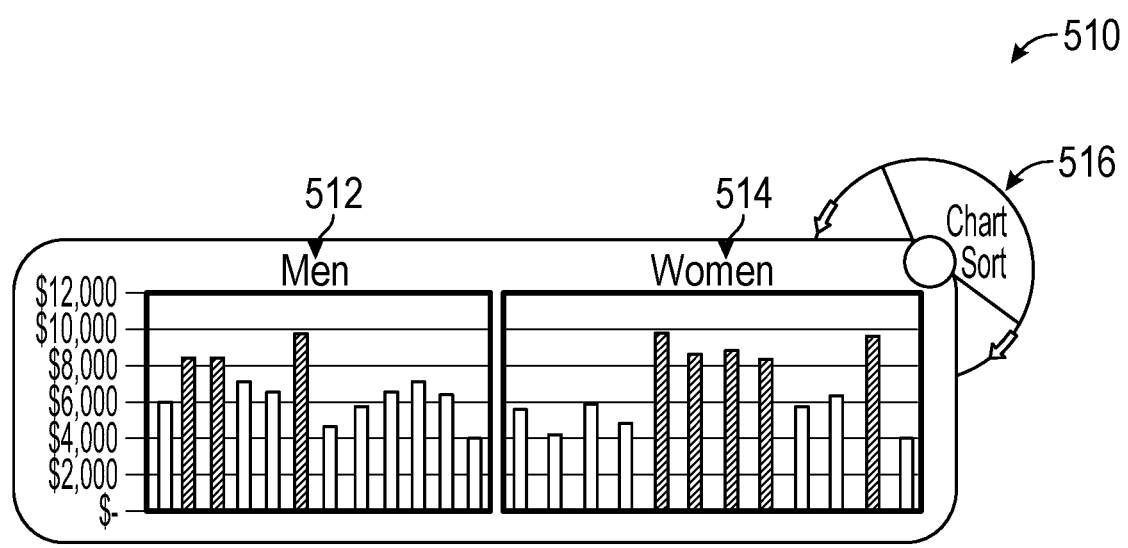

Display 28 is configured to provide the user with a visual display of the temporarily formatted and displayed chart(s) based on the selected data (See FIGS. 3-5 for exemplary displays). Input 205 is configured to receive input from one or more input sources, such as a keyboard, mouse, a touch screen, and/or some other input device. For example, the input may be a mouse movement over a displayed chart, a selection of data, a selection of a menu item, hovering over an item, and the like. Data store 240 is configured to store data relating to productivity application 24. For example, data store 240 may be used to store the data that is displayed within the rows and columns of a spreadsheet.

Visual manager 26 may also coupled to other applications 230 such that data to be temporarily formatted and charted may be received from the other applications. For example, visual manager 26 may be coupled to another productivity application and/or a networking site that provides data that is used in temporarily formatting and creating charts.

FIGS. 3-5 show exemplary user interfaces and displays for temporarily formatting and charting selected data. Referring now to FIG. 3, display 310 shows a spreadsheet containing rows and columns of data. The data may be provided by a variety of sources. For example, the data may be obtained from a database, a file, another application, a live data source, and the like. When a user would like to temporarily format and view data from the data source they enter a temporary charting mode and select the data they would like to be temporarily formatted and charted. In the current example, the user has selected the women's row and the men's row of data (315). The user may select as much data as they wish to view in a chart. For example, the user may select a single row, two rows, three rows, and the like. The user may also select as few or as many columns as they desire to view. For example, the user may select only a portion of the columns presented within the data.

The user may enter the temporary chart view in a variety of manners. In the current example, the user selects the selection option and the automatic option shown in user interface 320. Other user interfaces may be used to enter the mode. For example, the user could right click to bring up a context menu, select a menu option from a toolbar or menu, and the like. According to another embodiment, the chart may be automatically displayed upon the selection of data without first selecting a temporary charting option.

After entering the temporary formatting and charting mode, a selection of data, such as selection 315, displays the selected data in a chart form. As illustrated, display 330 shows chart 334 that displays a chart for the values in the selected women's row and chart 336 that displays a chart for the values in the selected men's row. According to one embodiment, a separate chart is created for each row of data that is selected. According to another embodiment, a single chart is created using the data. In the current example, the chart type was set to be automatically selected based on the selected data. Many different types of charts may be displayed, such as, but not limited too: column; line; area; and pie charts. According to one embodiment, charts 334 and 336 share a common axis (337) such that the charts may be easily compared. According to another embodiment, each chart is individually created such that each axis depends on the data within its selected row. As discussed above, when a user moves and navigates over the chart more information may be displayed to the user. In the current example, the user has moved over point 338 on line chart 334. In response to navigating to a point, a graphical representation of the corresponding value in the selected data is displayed. In the current example, point 338 corresponds to the May value in the Women's row which is $7,071. In the current example, a corresponding graphical display is provided in the other displayed charts at the corresponding location to point 338. For example, in chart 336, point 338 in chart 334 corresponds to point 339 in chart 336. The value for point 339 is $7,027 which is the May value from the Men's row. In addition to displaying the corresponding value from the other selected rows, a difference may also be graphically shown such that a direct comparison between the values of the charts may be readily determined. In the present example, the difference is $44 (7,071-7,027). More formatting of the data may be provided to assist the user in visualizing the data. For example, different colors may be used within the display, different values may be highlighted within the data, some data may be hidden from view, and the like. In display 330 it can be seen that the rows of data that are not selected are hidden from view while the charts are temporarily displayed. According to another embodiment, the charts that are temporarily displayed may be presented in one or more different windows from the display of the data.

FIG. 4 shows exemplary displays that illustrate different charting and formatting options.

Display 410 shows a display of a bar chart 412 for a women's row and a bar chart 414 for a men's row of data (416). The type of chart may be preconfigured, automatically selected based on the selected data (416) and/or changed from a default chart type. For example, a user may use a user interface such as user interface 320 that is displayed in FIG. 3 to select the chart type.

Display 420 shows a reference line 422 that is added to the display of the charts 412 and 414. As illustrated, the reference line is set to a value of $8,000. The reference line 422 spans across the displayed charts. According to one embodiment, values that fall below the reference line 422 are formatted differently from the values that are at or above the reference line 422. For example, the values below the reference line may be colored/shaded differently from the values that fall at or above the reference line. In the current example, values above the reference line are illustrated darker than the values at or below the reference line. The displayed values within data 424 may also be formatted based on the reference line 422 that is created.

Display 430 illustrates selecting a value in a displayed chart. As illustrated, a user has selected point 432. A user may select a point in different manners. For example, a user may navigate and hover over a point, click on the point, and the like. Point 432 corresponds to the December value for the women's row of data. When a point is selected, more information is provided to the user. According to one embodiment, the additional displayed information includes the value for the point as well as the difference between the point and the reference line. In the current example, the corresponding point is highlighted on the display of the other charts (in this case chart 414) and a corresponding display of information is presented. On the display of the men's chart 414, the value for the men's December value is presented along with the difference between the value and the reference line. Other information may also be included in the display. For example, a comparison could be made between the men's and women's data values and/or different formatting applied to the value that is larger/smaller then the selected point.

FIG. 5 illustrates a display of a bar chart in which the displayed charts have been sorted.

As illustrated, display 510 shows a display of a men's chart 512 and a display of a women's chart 514. In addition to changing the formatting of displayed charts, a user may sort the displayed charts based on various criteria. For example, in the current example, the charts displayed in FIG. 4 were sorted based on the chart title resulting in the display of the men's chart 512 to the left of the display of the women's chart 514. Spin control 516 is a control that may be used to sort the display of the charts. Other controls and/or user interfaces may also be used to control the sorting of the charts. Generally, spin control 516 is configured such that a user may cycle through a variety of options by selecting one of the displayed arrows on spin control 516. For example, the charts could be sorted based on downward trends, upward trends, chart title, low to high values, high to low values, average values, and the like. The selected option is illustrated within the display of spin control 516. In the current example, the current option selected is "Chart Title."

Figure 6:
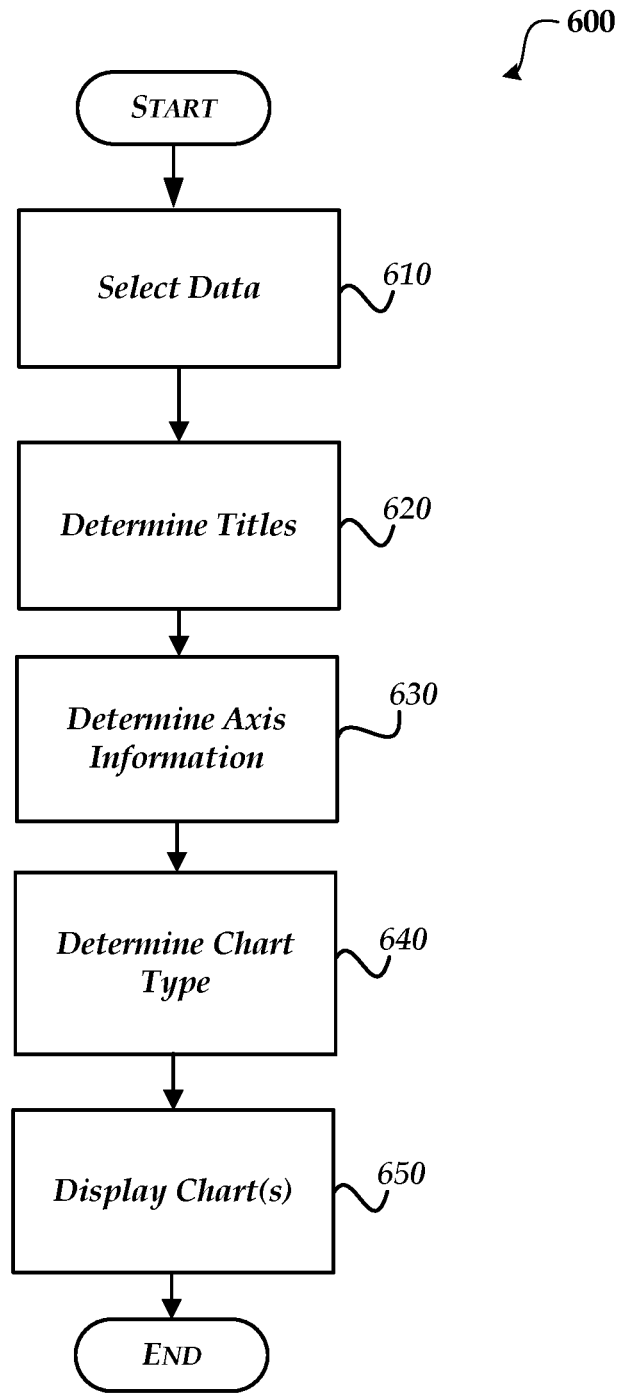
FIG. 6 illustrates a process for temporarily charting selected data.
Figure 7:
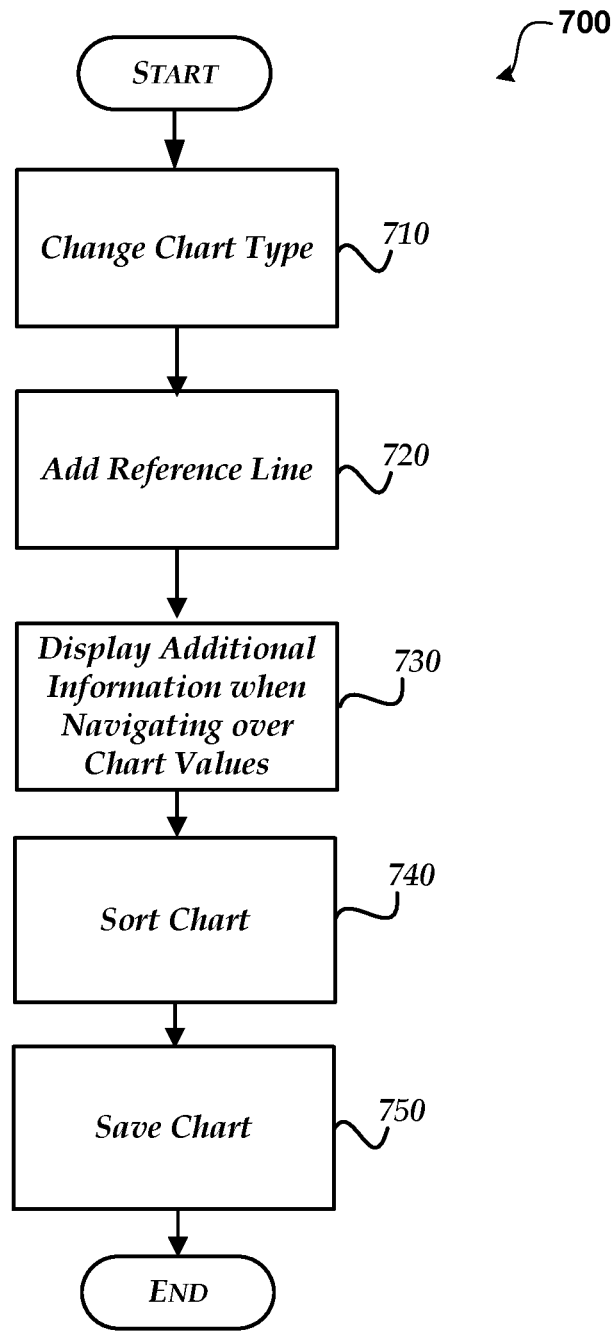
FIG. 7 shows a process for formatting temporarily displayed charts.

Referring now to FIGS. 6-7, illustrative processes for temporarily formatting and charting selected data is described.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 6 illustrates a process 600 for temporarily charting selected data.

After a start operation, the process flows to operation 610, where data to be temporarily formatted and charted is selected. A user may select as much or as little data to view within a chart as desired. For example, a user may select one or more full or partial rows of data.

Moving to operation 620, the chart title and axis information is determined from the selected data. When the data selected does not include the title information for the selected rows and/or columns, the data is traversed until the corresponding title for the row/column is obtained. For example, row data may be traversed from the right to the left until the title column for the row is reached. In the example illustrated above, each of the selected rows is traversed until the Women's title (Women) is obtained and the Men's title (Men) is obtained. Similarly, each column may be traversed to determine the title for each column. For example, for each selected column the data may be traversed until a title for the column is determined. In the examples presented above, the column titles are the selected months (i.e. January-December). While the column titles may not be initially displayed in the charts, this information may be used when a point is selected within a displayed chart (e.g. see point 338 in FIG. 3).

Flowing to operation 630, the axis information for the chart(s) to display is determined According to one embodiment, each displayed chart shares a common axis. The shared axis is determined from the range of the selected values.

Moving to operation 640, the chart type to display is determined. The chart type may be predetermined or the chart type may be determined based on a variety of factors such as: the number of values selected; the type of data selected; a range of values selected, and the like. The chart type may also be selected by a user. For example, a user may select an option to enter the temporary charting mode and select the type of chart that they would like to display when data is selected.

Transitioning to operation 650, the chart(s) are displayed. According to one embodiment, a separate chart is displayed for each row of data that is selected. For example, when one row is selected a single chart is displayed and when five rows are selected, five charts are displayed. According to one embodiment, a single chart may be used to display the selected data. In this embodiment, the data for each row may be visually formatted to distinguish the values from one row of selected data from another row of selected data. The charts may be displayed within the same window as the selected data or one or more different windows. For example, the charts may be displayed in a pop-up window over the displayed data. According to one embodiment, the data that is not selected is not displayed when the charts are displayed. According to another embodiment, the unselected data is displayed during the display of the charts. In addition to displaying the charts, the selected data may be formatted to further provide visual differences to the user.

The process then flows to an end operation and returns to processing other actions.

FIG. 7 shows a process 700 for formatting temporarily displayed charts.

After a start operation, the process flows to operation 710, where the chart type is changed for the temporarily displayed charts. The chart type that is displayed may be different types of charts. For example, the chart type may be a line chart, an area chart, a column chart, a pie chart, and the like. In addition to changing the chart type, the user may also switch the rows/columns. According to one embodiment, each of the displayed charts is displayed using the selected type of chart. According to another embodiment, each chart that is displayed may be of a different type.

Moving to operation 720, one or more reference lines is added to the display of the charts. The reference line spans across each of the displayed charts and provides a user with a visualization of how the values within the displayed chart compare to the reference value. The formatting of the values within the chart are determined based on whether the currently displayed value is above or below the reference line. For example, the values above the reference line are formatted in one manner (i.e. a first shade) and values below the reference line are formatted in a different manner (i.e. a second shade). When more than one reference line is displayed, the values between the two reference lines may be displayed in a third manner (i.e. a third shade). In addition to changing the formatting of the values based on the reference line, the values within the selected data may also be changed.

Flowing to operation 730, additional information is displayed to a user in response to navigating over points of the displayed charts. For example, as the user navigates over the chart, the current value of the navigated point may be displayed. According to one embodiment, the corresponding values in the other charts are also displayed. When a reference line is displayed, the current value of the navigated point may also be compared to the reference line.

Transitioning to operation 740, different sorting options may also be selected by a user. For example, the charts could be sorted based on downward trends, upward trends, chart title, low to high values, high to low values, average values, and the like.

Moving to operation 750, one or more of the charts may be saved for later display. The charts may be saved as a group or each chart may be individually selected for saving. The charts may be saved in many different ways. For example, the charts may be saved using a copy operation and saved to a clipboard, the charts may be saved as an image file, and the like.

The process then flows to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for temporarily formatting and charting data, comprising:
   receiving a user selection by a user of a portion of data from rows and columns of data that is currently displayed within a window of a productivity application on a display;
   in response to the user selection of the portion of data, automatically formatting and creating a chart without receiving a selection of a charting option, comprising:
      determining values within the selected data;
      automatically determining a single chart type based on the selected data; and
      automatically creating a chart of the single chart type;
   displaying the chart representing the values from the selected data in the window from which the portion of data is selected;
   receiving user interactions with the chart; and
   in response to determining that the user has completed interacting with the chart, removing the chart from the window,
      wherein displaying the chart comprises displaying a plurality of charts to provide a separate chart for each row or each column within the selected data,
   the method further comprising:
      displaying a value of a point in the chart when the point in the chart is navigated; and
      comparing the value of the point that is navigated to each of other displayed charts, of the plurality of displayed charts, and providing an indication of a difference of the values between the plurality of charts.

2. The method of claim 1, further comprising displaying each separate chart using a common axis.

3. The method of claim 1, further comprising determining labels for the plurality of charts by traversing the data until the labels are reached within the data from which the data is selected.

4. The method of claim 1, further comprising displaying a reference line across the plurality of charts and formatting values in relation to a value of the reference line.

5. The method of claim 4, wherein selecting a point on one of the displayed plurality of charts displays information relating to a comparison of the reference line to a value of the selected point.

6. A computer storage medium, excluding a signal, having computer-executable instructions for temporarily formatting and charting data, the instructions executing on a processor of a computer, comprising:
   receiving a user selection by a user of data that is selected from a portion of data that is included within a table that is displayed within a window of a productivity application;
   determining all of a plurality of values within the selected data;
   automatically determining a single chart type to display the selection of data based on the selection of data;
   in response to receiving the selection of data, automatically formatting and creating a chart of the single chart type representing the plurality of values from the selected data without receiving a selection of a charting option;

displaying the chart in the window; receiving user interactions with the chart; and in response to determining that the user has completed interacting with the chart, removing the chart from display in the window, wherein displaying the chart comprises displaying a plurality of charts to provide a separate chart for each row or column within the selected data; and wherein each of the separate charts includes a common axis, the instructions further executing on the processor for removing a display of unselected data in the window upon a temporary display of the chart.

7. A computer storage medium, excluding a signal, having computer-executable instructions for temporarily formatting and charting data, the instructions executing on a processor of a computer, comprising:

receiving a user selection by a user of data that is selected from a portion of data that is included within a table that is displayed within a window of a productivity application;

determining all of a plurality of values within the selected data;

automatically determining a single chart type to display the selection of data based on the selection of data;

in response to receiving the selection of data, automatically formatting and creating a chart of the single chart type representing the plurality at values from the selected data without receiving a selection of a charting option;

displaying the chart in the window;

receiving user interactions with the chart; and in response to determining that the user has completed interacting with the chart, removing the chart from display in the window, wherein displaying the chart comprises displaying a plurality of charts to provide a separate chart for each row or column within the selected data; and wherein each of the separate charts includes a common axis, the instructions further executing on the processor for sorting the displayed charts and updating the display in response to the sorting.

8. A computer storage medium, excluding a signal, having computer-executable instructions for temporarily formatting and charting data, the instructions executing on a processor of a computer, comprising:

receiving a user selection by a user of data that is selected from a portion of data that is included within a table that is displayed within a window of a productivity application;

determining all of a plurality of values within the selected data;

automatically determining a single chart type to display the selection of data based on the selection of data, in response to receiving the selection of data, automatically formatting and creating a chart of the single chart type representing the plurality of values from the selected data without receiving a selection of a charting option;

displaying the chart in the window;

receiving user interactions with the chart; and in response to determining that the user has completed interacting with the chart, removing the chart from display in the window, wherein displaying the chart comprises displaying a plurality of charts to provide a separate chart for each row or column within the selected data; and wherein each of the separate charts includes a common axis, the instructions further executing on the processor for comparing a value of a point that is navigated via the user interactions to each of the other displayed charts and providing an indication of a difference of the plurality of values between the charts.

9. The computer storage medium of claim 6, further comprising determining labels for the plurality of charts by traversing the table of data until the labels are reached within the table from which the data is selected.

10. The computer storage medium of claim 6, further comprising displaying a reference line across the plurality of charts and formatting values in relation to a value of the reference line.

11. The computer storage medium of claim 10, wherein selecting a point on one of the displayed plurality of charts displays information relating to a comparison of the reference line to a value of the selected point.

* * * * *